United States Patent [19]
Muta et al.

[11] 3,711,585
[45] Jan. 16, 1973

[54] USE OF YTTRIA-MAGNESIA MIXTURES TO PRODUCE HIGHLY TRANSPARENT SINTERED ALUMINA BODIES

[75] Inventors: Akinori Muta, Tokyo; Gyozo Toda, Hino-shi; Takanobu Noro, Yokohama; Chieko Yamazaki, Tokorozawa-shi, all of Japan

[73] Assignee: Hitachi, Ltd., Tokyo, Japan

[22] Filed: Aug. 12, 1969

[21] Appl. No.: 849,448

[30] Foreign Application Priority Data

Aug. 19, 1968    Japan..............................43/58557

[52] U.S. Cl. .....................264/65, 106/58, 106/62, 106/65, 264/66
[51] Int. Cl.....C04b 35/10, C04b 35/04, C04b 35/50
[58] Field of Search ..............264/65, 66, 56; 106/65

[56] References Cited

UNITED STATES PATENTS

| | | |
|---|---|---|
| 3,377,176 | 4/1968 | Wolkodoff et al.....................264/65 |
| 3,607,436 | 9/1971 | Charles et al..........................106/65 |
| 3,026,177 | 3/1962 | Pierre et al............................106/39 |
| 3,026,210 | 3/1962 | Coble....................................106/39 |
| 3,088,832 | 5/1963 | Somers..................................106/39 |
| 3,244,539 | 4/1966 | Hare......................................106/65 |
| 3,311,482 | 3/1967 | Klingler et al.........................106/65 |
| 3,459,564 | 8/1969 | Lachman................................106/65 |

FOREIGN PATENTS OR APPLICATIONS

| | | |
|---|---|---|
| 740,956 | 8/1966 | Canada..................................106/65 |
| 867,833 | 5/1961 | Great Britain..........................106/65 |
| 1,027,939 | 4/1966 | Great Britain..........................106/65 |

OTHER PUBLICATIONS

Y. S. Kim et al., "Theoretically Dense (99.9%) Polycrystalline Alumina Prepared from Cryochemically Processed Powders," an article appearing in the June 1971 issue of the Ceramic Bulletin at pages 532–535.

J. E. Burke (Ed.), Progress In Ceramic Science, Vol. 3, 1963, The MacMillan Company, New York, pages 240–249.

*Primary Examiner*—Donald J. Arnold
*Assistant Examiner*—John H. Miller
*Attorney*—Craig, Antonelli and Hill

[57] ABSTRACT

By using a combination of magnesia and yttria, or their precursors, in small amounts as sintering aids for alumina, sintered bodies having very high in-line transmission properties are produced. In addition the sintering time and/or temperature required to achieve a given inline transmission is reduced as compared with using only magnesia as a sintering aid.

17 Claims, 4 Drawing Figures

PATENTED JAN 16 1973 3,711,585

INVENTOR
AKINORI MUTA, GYOZO TODA, TAKANOBU NORI
and CHIEKO YAMAZAKI

BY Craig, Antonelli, Stewart & Hill
ATTORNEY

USE OF YTTRIA-MAGNESIA MIXTURES TO PRODUCE HIGHLY TRANSPARENT SINTERED ALUMINA BODIES

The present invention relates to a highly transparent alumina sintered body and to a process for preparing the same.

In order to obtain a highly transparent alumina sintered body, it is of great importance to carry out operations so that the resulting sintered body will contain a small amount of pores. Thus, research has been conducted to find elements which, when added to alumina, may inhibit the discontinuous grain growth of alumina and facilitate the escape of pores, with regard to sintering. Compounds such as oxides and salts of Ba, B, Co, Cu, Fe, Hg, Mn, Ti, Mo, Zr, Y and Zn have been examined for use in supplying these elements.

Recently, there have been developed processes for obtain-ing a relatively highly transparent alumina sintered body by compacting an alumina powder of high purity incorporated with a small amount of magnesium oxide and then sintering the thus compacted powder at an elevated temperature.

These processes may be carried out, for example, in the following manner.

1. A fine alumina powder containing magnesium oxide in an amount of at most 0.5 weight percent is molded, and the thus molded alumina powder is presintered for more than an hour in an oxidizing atmosphere at a temperature of from 1,000 to 1,700°C and subsequently sintered in vacuum or in hydrogen atmosphere at a temperature of 1,700 to 1,900°C (refer to U.S. Pat. No. 3,026,210).

2. A mixture of aluminum sulfate and a magnesium salt which can be converted to magnesia by thermal decomposition is heated to a temperature of not higher than 1,000°C to obtain a powder mixture of magnesia and $\gamma$-alumina, and the thus obtained $\gamma$-alumina contained in the powder mixture is converted to $\alpha$-alumina. The resulting powder is compression-molded and then sintered at a temperature of from 1,700 to 1,950°C.

3. A substantially pure, finely-divided alumina powder is compression-molded to form a shaped body and the shaped body is presintered in hydrogen atmosphere at a temperature of from about 1,650 to 1,750°C for a period of from about 50 to 300 minutes to remove the gas!-containing pores from the body. The thus presintered body is subjected to the final sintering in a hydrogen atmosphere at a temperature of from about 1,800 to 2,000°C for a period of at least 15 minutes to additionally remove the residual pores and to improve the transparency of the body (refer to U.S. Pat. No. 3,026,177).

4. A fine alumina powder containing yttrium oxide powder in an amount of 0.5 to 6 weight percent is molded to form a shaped body, and the shaped body is sintered at a temperature of from 1,625 to 1,700°C.

The thus sintered bodies can widely be utilized for metal gas sealing tubes of high pressure metal vapor discharge lamps, furnace materials, electronics materials and other heat-resisting and corrosion-resisting materials.

However, the sintered bodies prepared by the above-mentioned conventional processes have an in-line transmission of at most about 50 percent. Thus the conventional processes are unsuitable for the preparation of bodies which require high transparency, high density and high strength, and individually have drawbacks such as the requirement of an extremely high sintering temperature for the preparation of the bodies of high quality.

The above-mentioned process of paragraph 3, for example, requires a high temperature of at least 1,900°C for obtaining a sintered body of high density and high transparency, and, since the prevention of the grain growth of alumina powder is difficult due to the discontinuous grain growth of crystal particles, this process cannot afford a sintered body of high density and high transparency.

The processes of paragraphs 1 and 2 also required an extremely high temperature for obtaining a sintered body of high density and high transparency. With respect to the above-mentioned conventional processes of paragraphs 2 and 3, in case of employing a final sintering temperature of 1,700°C, the in-line transmission of the obtained sintered body is simply not more than 10 percent.

With respect to the process of paragraph 4, a lot of pores still remain in the sintered body prepared under the most suitable conditions, and the transparency of this body, in general, is inferior to that of other conventional processes. Further this process has such defects in heat resistance that the heat-resisting temperature of the sintered body of this process using yttrium oxide is extremely low, i.e., 1,800°C as compared with that of other conventional process, i.e., about 2,000°C.

The in-line transmission is herein defined as the ratio of an intensity of the radiant energy entering a given sample within a specified entrance steric angle, to an intensity of the radiant energy transmitting within the same steric angle as said specific entrance steric angle among the radiant energy transmitting through said sample.

In the present specification, the in-line transmission is an average value of transmittivity over a wavelength range of 320 to 1,100 m$\mu$ which passes through a sample of 0.5 mm thickness, and is represented by percentage.

The object of the present invention is to prepare a polycrystalline alumina sintered body of adequately high transparency, high strength and high density by carrying out the final sintering at a lower temperature than that of the conventional arts.

Another object of the present invention is to provide a polycrystalline alumina sintered body of higher transparency than that of the conventional arts.

Further, another object of the present invention is to prepare a polycrystalline alumina sintered body in which the grain growth of crystal powder proceeds very slowly even when placed under a high temperature for a long period of time.

The present invention provides a process for preparing a transparent alumina sintered body which comprises the steps of adding a small amount of substances that can inhibit the alumina grain growth, to the main component comprising at least one member selected from the group consisting of highly pure alumina and aluminum compounds that can be converted to highly pure alumina by calcination in an oxidizing atmosphere, and then subjecting the mixture thereof to molding and to sintering, characterized by using, as the said substances, a small amount of at least one member selected from the group consisting of yttrium oxide and yttrium compounds that can be converted to yttrium oxide by calcination in an oxidizing atmosphere and at least one member selected from the group consisting of magnesium oxide and magnesium compounds that can be converted to magnesium oxide by calcination in an oxidizing atmosphere.

Magnesium oxide and yttrium oxide employed in the present invention inhibit the discontinuous grain growth of alumina crystalline powder and facilitate the removal of pores in the alumina crystalline grains and on the crystalline grain boundary, whereby they increase the density of the resulting sintered body. The present invention has been established on the basis of the findings that the use of magnesium oxide and yttrium oxide in combination even in a small amount gives an excellent polycrystalline alumina sintered body.

Almost all of the magnesium oxide added to alumina vaporizes at the sintering stage and only a trace of magnesium oxide remains in the resulting sintered body.

Yttrium oxide, in contrast thereto, remains in the alumina crystalline grains even after the final sintering, and thus it plays a role of inhibiting the discontinuous grain growth of the crystalline grains, even after the vaporization of the magnesium oxide.

The present invention is described in detail below with reference to the appended drawings.

Figure 1:
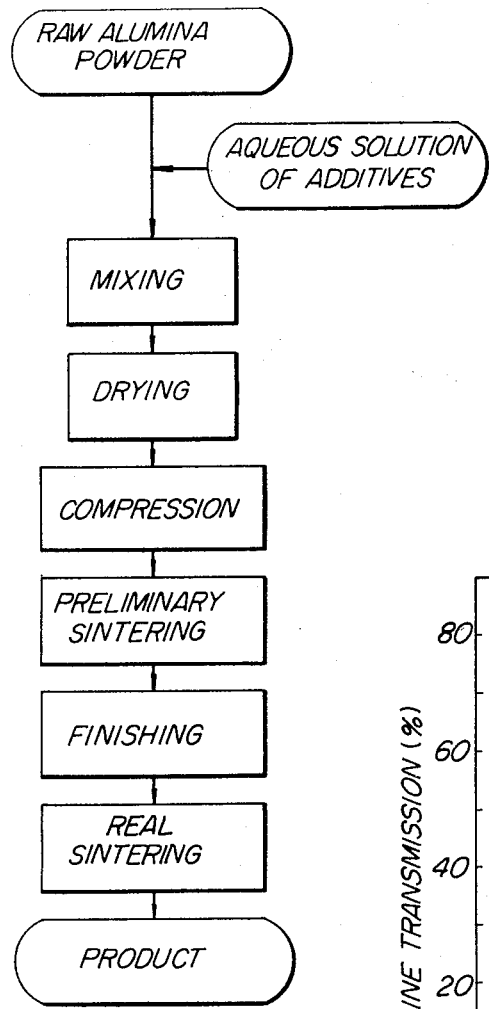
FIG. 1 is a flow sheet showing an example of the steps for the preparation of transparent alumina sintered body of the present invention.

Raw alumina employed in the present invention is preferably as pure and as fine in particle size as possible. Ordinarily, alumina having an average particle size up to 0.5 $\mu$ is used.

Particularly from the view points of heat resistance and corrosion resistance to metal vapor or the like, the use of alumina which contains as little silica as possible is desired.

The employment in place of alumina of such an aluminum compound as aluminum sulfate which can be converted to $\alpha$-alumina by calcination may provide substantially the same results.

As the above-mentioned additives, such soluble compounds as chlorates, fluorates or carbonates of magnesium and yttrium which can finally be converted to the oxides thereof by calcination may preferably be used in accordance with a wet method.

Alternatively, the powders of magnesium oxide, and yttrium oxide in as such may be mixed with alumina in accordance with a wet or dry method under such conditions that the alumina can be mixed therewith thoroughly and homogeneously.

The mixture of alumina and the additives in accordance with a wet method is dried in such a manner as to vaporize the solvent mainly by stirring at room temperature and removing the residual volatiles completely in an air bath kept at a temperature of from 100 to 200°C.

The pressurization at the molding step is not particularly restricted but is preferably about 1 to 3 t/cm$^2$.

The presintering step of the present invention is intended to convert the additives to the oxides thereof, to remove the unnecessary volatile components from the mixture and, if desired, to give preferable properties for working which may be required for the reforming to the desired shape.

Therefore, the presintering is carried out mainly in an oxidizing atmosphere at a temperature of not less than 1,000°C, and heating for about one hour is adequate. If the heating temperature of presintering is too high, the sintering of the shaped body proceeds to a relatively great extent, and the above-mentioned reprocessing becomes difficult to carry out. Thus when the re-processing after the presintering is taken into account, the presintering temperature should be specified as being not higher than 1,300°C.

Even when the re-processing after presintering is not taken into account, such a high temperature as above 1,600°C is not desirable.

The reason therefor is that the high-temperature heating promotes the alumina crystal grain growth and makes it very hard to remove the pores on the crystal grain boundary. Accordingly, it is sufficient to heat the mixture in air at a temperature of from 1,000 to 1,600°C for more than 5 minutes.

The shaped body may be machined when particularly precise dimensions of the body are required or when the molded body has been greatly deformed during the presintering.

The sintering step is carried out at a temperature within the range of 1,600°C – 1,900°C, in a reductive atmosphere where oxygen-wanting lattice defects are liable to be introduced into alumina crystals, or in such an evacuated atmosphere that the pores in the crystal grains can easily escape out of the crystals.

The lower the sintering temperature, the longer the sinter-ing time. That is, in case the sintering is effected at such a relatively low temperature as about 1,600°C, a sintering time of from several hours to several tens of hours is necessary, whereas in case the sintering is effected at a temperature of about 1,900°C, heating for 5 minutes or so is sufficient. In general, sintering is desirably carried out at a temperature of from 1,700 to 1,900°C for a period of 2 to 5 hours.

When hydrogen is selected as the sintering atmosphere, the selection of a temperature of higher than 1,950°C is not desirable. because heating of the alumina shaped body at this high temperature in a hydrogen atmosphere may reduce the yttrium oxide mixed and color the shaped body. If the heating is carried out for a short period of time, the reduction is not as extensive, but too short of a sintering time makes it difficult to produce a homogeneous sintered body.

Figure 2:
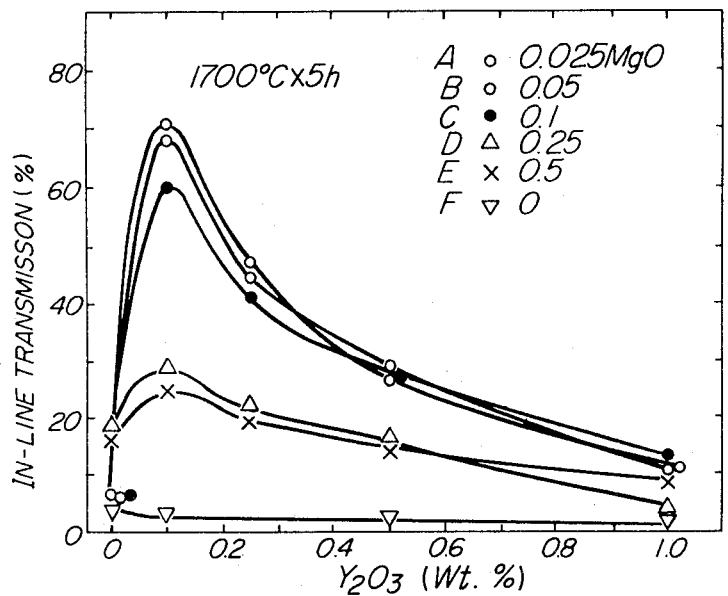
FIG. 2 is a graph showing the relationship between the inline transmission of sintered bodies of the present invention and the amount of yttrium oxide and magnesium oxide added to alumina.

FIG. 2 shows the results of the case where the amount of magnesium oxide was varied from 0 to 0.5 percent and the amount of yttrium oxide from 0 to 1.0 percent.

The sintered bodies of the example shown in FIG. 2 were prepared in the following manner.

Specified amounts of aqueous solutions of yttrium chloride and magnesium chloride were added to highly pure fine alumina powder having an average particle size of about 0.3 $\mu$. The resulting mixture was thoroughly stirred to form a homogeneous slurry, dried in an air bath at about 100°C and then molded under a pressure of 2 t/cm$^2$. Subsequently the molded body was presintered in air at 1,100°C for 1 hour, and then sintered in a hydrogen atmosphere at 1,700°C for 5 hours.

The line shrinkage of the molded body was from 2 to 3 percent at the presintering step, and from 18 to 20 percent at the sintering step.

The thus obtained plate-like transparent alumina sintered body was abraded to a thickness of 0.5 mm and used for the measurement of the in-line transmission.

This result shows that, with respect to all curves, the in-line transmission of the sintered body with about 1 percent yttrium oxide addition is almost the same as that of the sintered body without the yttrium oxide addition and the effective amount of yttrium oxide addition is approximately 1 percent or less irrespectively of the magnesium oxide addition.

Further, the amount of yttrium oxide which gives the largest in-line transmission of the sintered body is about 0.1 percent except the case of no addition of magnesium oxide.

Meanwhile, with respect to the amount of addition of magnesium oxide, when added singly to alumina, the addition of from 0.25 to 0.5 percent gives about 20 percent in-line transmission of the sintered body and the addition of more than 0.5 percent gives from 6 to 7 percent thereof. In contrast thereto, the results of the composite addition of magnesium oxide and yttrium oxide to alumina in accordance with the present invention is entirely different from that of the above-mentioned case where magnesium oxide is singly added to alumina. The addition of magnesium oxide in an amount of 0.1 percent or less affords a sintered body of the most preferable transparency.

As mentioned above, the relationship between the amount of the yttrium oxide addition to alumina and the in-line transmission of the sintered body is retained in both cases where the sintering temperature is higher than 1,700°C and where it is lower than 1,700°C.

The above-mentioned results clarify the existence of an effect which cannot be obtained by the single addition of yttrium oxide or magnesium oxide to alumina, that is, the existence of a certain geometric action effectively induced by the composite addition of the two compounds to alumina.

Figure 3:
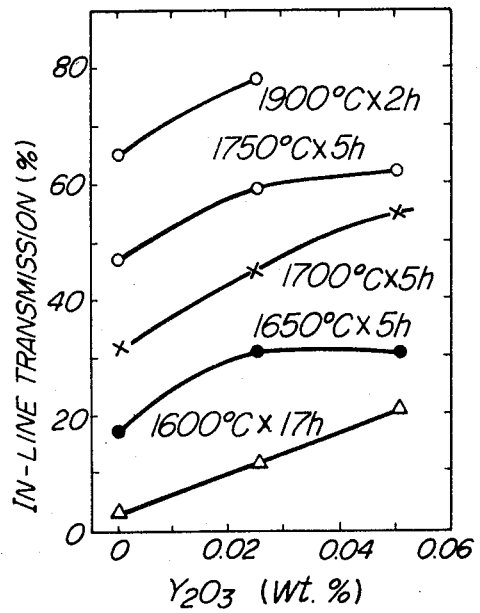
FIG. 3 is a graph showing the relationship between the in-line transmission of sintered bodies of the present invention and the amount of yttrium oxide added to alumina with the constant addition of magnesium oxide thereto.

FIG. 3 shows the relationship between the in-line transmission of the sintered body and the amount of the yttrium oxide addition which is varied within a very small range.

In this example, the average particle size of raw alumina is about 0.1 $\mu$; the amount of magnesium oxide addition is 0.05 percent; the molding pressure is 2 t/cm$^2$; the presintering temperature, time and atmosphere are 1,100°C, 1 hour and air respectively; and the atmosphere of the final sintering is hydrogen.

The above-mentioned results clarify that the yttrium oxide addition even in an extremely small amount (0.025 percent) increases the in-line transmission by about 10 percent more than the case of excluding the yttrium oxide addition, and that, when yttrium oxide and magnesium oxide coexist in alumina, yttrium oxide, even if added in an extremely small amount, exerts effective actions.

Further, the results shown in FIG. 3 clarify that the high sintering temperature affords a highly transparent sintered body and reduces the sintering time.

Figure 4:
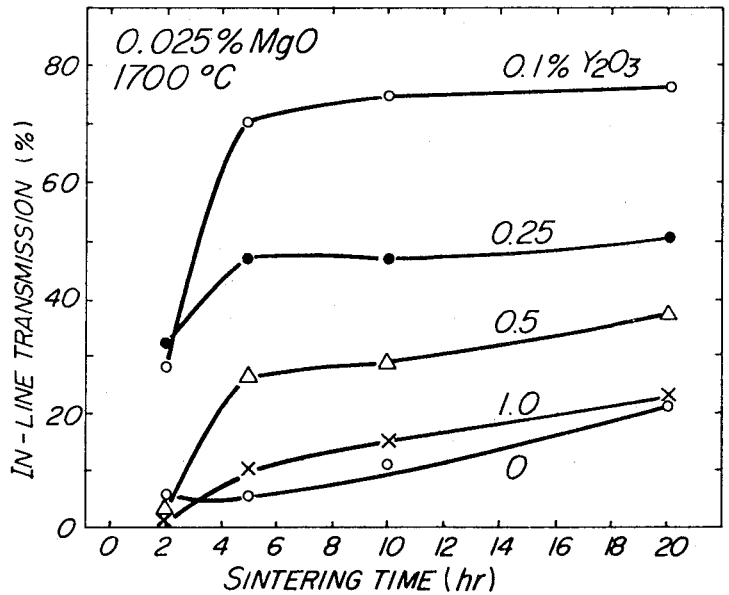
FIG. 4 is a graph showing the relationship between the inline transmissions of sintered bodies obtained under several different conditions and the amount of yttrium oxide added to alumina.

FIG. 4 shows, with respect to several examples wherein the amounts of yttrium oxide additions differ from one another, the relationship between the sintering time and the in-line transmission of the obtained sintered body. The production condition of the sintered body shown in FIG. 4 is the same as that of the example shown in FIG. 2. Sintering time means the soaking after elevating to a given temperature.

As the result, in case of excluding the yttrium oxide addition, the in-line transmission of the sintered body increases almost linearly in proportion to the heating period of sintering. The rate of increase, however, is extremely small, and the 20 hour heating simply gives a sintered body having an in-line transmission of about 20 percent.

In contrast thereto, the practice of the present invention with a heating time of less than 5 hours enables the rapid increase of transmission.

All of the above-mentioned embodiments show the cases of effecting the sintering in hydrogen atmosphere. Alternatively, even when the sintering is effected in an evacuated atmosphere, the same transparent alumina sintered body as in the above embodiments can be obtained.

Table 1 set forth below shows the in-line transmission of sintered bodies prepared by adding yttrium oxide in an amount varied within 0 to 1 percent and magnesium oxide in an amount of 0.1 percent to fine alumina having an average particle size of 0.3 $\mu$ and sintering the mixture in vacuum.

TABLE 1

| Amount of yttrium oxide | 0 | 0.1 | 0.25 | 0.5 | 1 |
|---|---|---|---|---|---|
| In-line transmission % | 21.5 | 53.0 | 40.2 | 32.5 | 25.3 |

The production of sintered bodies of this example was effected in the same manner as that of every other aforesaid embodiment, and the sintering was carried out at a temperature of 1,700°C for 5 hours.

Table 2 set forth below shows the in-line transmission of sintered bodies obtained in case of using aluminum sulfate as a starting material in place of alumina.

TABLE 2

| Amount of Y$_2$O$_3$ added % | 0 | 0.1 | 0.25 | 0.5 | 1.0 |
|---|---|---|---|---|---|
| In-line transmission % | 20.5 | 51.0 | 3.52 | 29.3 | 21.8 |

In case of using aluminum sulfate or the like, which can be converted to alumina by calcination, as a starting material, the powder thereof is mixed with additives in a wet state, and the mixture is thoroughly stirred and heated to a temperature of 100 to 120°C in an air bath while stirring to dry the mixture. Subsequently, the mixture is heated to a temperature of 1,000 to 1,100°C for 1 hour to form a powder mixture of γ-alumina, yttrium oxide and magnesium oxide, and further heated to 1,300°C for 1 hour to form a powder mixture of α-alumina, yttrium oxide and magnesium oxide.

In this example, the amount of magnesium oxide addition was 0.05 percent; the presintering was effected in air at 1,200°C for 1 hour; and the sintering was effected in hydrogen atmosphere at 1,700°C for 5 hours.

The in-line transmission of sintered bodies of this example are similar to those of the above-mentioned example shown in FIG. 2. Evidently, even when a material which can be converted to alumina by calcination is used as the starting material in place of alumina, the effect due to the yttrium oxide addition can also be displayed remarkably.

As is made clear by the above-mentioned examples, the present invention provides an excellent effect which resolves itself into the following three points.

1. The present invention provides a sintered body having about 10 percent or so high transparency than that of polycrystalline alumina sintered conventionally prepared by the single addition of magnesium oxide to alumina.

2. The present invention, in practice, provides a sintered body having an equivalent transparency to that of the polycrystalline alumina sintered bodies prepared by the conventional processes at a lower sintering temperature than that of the conventional processes, and, besides, shortens the heating time required for the sintering.

For example, in order to obtain a sintered body having 60 percent in-line transmission, the conventional processes require the heating at 1,900°C, but the present invention only requires the heating at 1,700°C in case of adding, magnesium oxide in an amount of 0.1 percent to raw alumina and yttrium oxide in an amount of 0.1 percent.

The fact that the present invention provides a sintered body having an almost equivalent transparency to that of a sintered body prepared by the conventional art is a technically excellent significance in view of the fact that the production of a furnace which can be run steadily particularly at a temperature of not lower than 1,700°C, is extremely difficult.

With respect to the heating time, the 5 hour sintering at 1,700°C of the example of the present invention which includes the composite addition of yttrium oxide in an amount of 0.5 percent and magnesium oxide in an amount of 0.1 percent affords a sintered body having about 30 percent in-line transparency. In contrast thereto, the 20 hour sintering (4 times as long as that of the present invention) of the conventional process, which excludes the yttrium oxide addition, at the same temperature as that of the present invention nearly affords a sintered body having about 20 percent transparency. This fact also illustrates the superiority of the present invention.

3. The mechanical strength of the alumina sintered body depends on the fineness and homogeneity of the crystalline powders which compose the sintered body. The alumina sintered body of the present invention contains yttrium oxide which is dispersed in the alumina crystals of the sintered body. Yttrium oxide in these alumina crystals plays a role of preventing the grain growth of the alumina crystals. Thus, even if the sintered body of the present invention is used at an extremely high temperature exceeding 2,000°C for a long period of time, its alumina grain growth proceeds extremely slowly. Thus, the sintered body of the present invention possesses an excellent durability with respect to mechanical strength. In contrast thereto, magnesium oxide of the conventional processes, when added to alumina, is mainly dispersed on the alumina crystal grain boundary and vaporizes mostly at the sintering step and thus it cannot prevent the unnecessary grain growth of alumina powder when the sintered body is placed at a high temperature for a long period of time.

As mentioned above, the polycrystalline semi-transparent alumina sintered body prepared by the practice of the present invention is superior to that of the conventional processes, and exhibits excellent properties when used as a metal gas-sealing tube for a high pressure metal vapor discharge lamp, as materials for furnaces, as heat resisting materials for various purposes, etc.

What is claimed is:

1. A process for producing a transparent polycrystalline alumina sintered body having an in-line transmission of at least 40 percent per 0.5 millimeter thickness of a radiant energy of wavelengths between 320 and 1,100 millimicrons which comprises the steps of (a) preparing a homogeneous powdery mixture consisting essentially of highly pure fine alumina having a particle size conventionally suitable for sintering, at least one member selected from the group consisting of yttrium oxide and yttrium compounds capable of being converted to yttrium oxide by calcination in an oxidizing atmosphere, the amount of said member selected being a small but effective amount for obtaining said in-line transmission up to 0.25 percent by weight of yttrium oxide, and at least one other member selected from the group consisting of magnesium oxide and magnesium compounds capable of being converted to magnesium oxide by calcination in an oxidizing atmosphere, the amount of said other member selected being a small but effective amount for obtaining said in-line transmission up to 0.1 percent by weight of magnesium oxide, (b) press-molding said mixture, (c) presintering the molded product in an oxidizing atmosphere at a temperature of 1,000° to 1,600°C. for a period of time from 5 to 60 minutes, and (d) sintering the presintered product in an environment selected from the group consisting of hydrogen and vacuum at a temperature of 1,700° to 1,900°C. for a period of time ranging from that sufficient to produce a sintered body having said in-line transmission up to about 5 hours, the amount of sintering time being less at the higher sintering temperatures.

2. A process according to claim 1, wherein the yttrium compound is yttrium chloride and the magnesium compound is magnesium chloride.

3. A process according to claim 1, wherein the presintering and sintering steps comprise presintering in air at a temperature of 1,000° to 1,600°C. for 5 to 60 minutes and then sintering in a hydrogen atmosphere at a temperature of 1,700° to 1,900°C. for more than 1 hour.

4. A process according to claim 3, wherein the sintering step is carried out in a hydrogen atmosphere at a temperature of 1,700 to 1,900°C. for 2 to 5 hours.

5. A process according to claim 1, wherein the amount of yttrium oxide is from 0.025 to 0.25 weight percent and the amount of yttrium compounds is sufficient to produce 0.025 – 0.25 weight percent yttrium oxide and the amount of magnesium oxide is from 0.025 to 0.1 weight percent and the amount of magnesium compounds is sufficient to produce 0.025 – 0.1 weight percent of magnesium oxide, based on alumina, respectively.

6. A process according to claim 1, wherein the yttrium compounds are at least one member selected from the group consisting of yttrium chlorate, yttrium fluorate and yttrium carbonate and the magnesium compounds are at least one member selected from the group consisting of magnesium chlorate, magnesium fluorate and magnesium carbonate.

7. A process according to claim 1, wherein said effective amount of yttrium oxide is at least 0.01 weight percent and said effective amount of magnesium oxide is at least 0.025 weight percent.

8. A process according to claim 1, wherein said fine alumina has an average particle size of from 0.1 to $0.5\mu$.

9. A process for producing a transparent polycrystalline alumina sintered body having an in-line transmission of at least 40 percent per 0.5 millimeter thickness of a radiant energy of wavelengths between 320 and 1,100 millimicrons which comprises the steps of (a) preparing a homogeneous powdery mixture consisting essentially of aluminum compounds capable of being converted to alumina by calcination in an oxidizing atmosphere, at least one member selected from the group consisting of yttrium oxide and yttrium compounds capable of being converted to yttrium oxide by calcination in an oxidizing atmosphere, the amount of said member selected being a small but effective amount for obtaining said in-line transmission up to 0.25 percent by weight of yttrium oxide, and at least one other member selected from the group consisting of magnesium oxide and magnesium compounds capable of being converted to magnesium oxide by calcination in an oxidizing atmosphere, the amount of said other member selected being a small but effective amount for obtaining said in-line transmission up to 0.1 percent by weight of magnesium oxide, (b) converting the aluminum compounds to $\alpha$-alumina by calcination in an oxidizing atmosphere, so that the resulting alumina has a particle size conventionally suitable for sintering, (c) press-molding the calcined mixture, (d) presintering the molded product in an oxidizing atmosphere at a temperature of 1,000° to 1,600°C. for a period of time from 5 to 60 minutes, and (e) sintering the presintered product in an environment selected from the group consisting of hydrogen and vacuum at a temperature of 1,700° to 1,900°C. for a period of time ranging from that sufficient to produce a sintered body having said in-line transmission up to about 5 hours, the amount of sintering time being less at the higher sintering temperature.

10. A process according to claim 9, wherein the amount of yttrium oxide is from 0.025 to 0.25 weight percent and the amount of yttrium compounds is sufficient to produce 0.025 – 0.25 weight percent of yttrium oxide and the amount of magnesium oxide is from 0.025 to 0.1 weight percent and the amount of magnesium compounds is sufficient to produce 0.025 – 0.1 weight percent of magnesium oxide, based on the alumina, respectively.

11. A process according to claim 9, wherein the yttrium compounds are at least one member selected from the group consisting of yttrium chlorate, yttrium fluorate and yttrium carbonate and the magnesium compounds are at least one member selected from the group consisting of magnesium chlorate, magnesium fluorate and magnesium carbonate.

12. A process according to claim 9, wherein the aluminum compound employed is highly pure fine aluminum sulfate.

13. A process according to claim 9, wherein the sintering is carried out at a temperature of 1,700° to 1,900°C. for 2–5 hours.

14. A process according to claim 9, wherein the aluminum compounds have an average particle size of from 0.1 to $0.5\mu$.

15. A process for producing a transparent polycrystalline alumina sintered body having an in-line transmission of at least 60 percent per 0.5 millimeter thickness of a radiant energy of wavelengths between 320 and 1,100 millimicrons which comprises the steps of (a) preparing a homogeneous powdery mixture consisting essentially of highly pure fine alumina having a particle size conventionally suitable for sintering, at least one member selected from the group consisting of yttrium oxide and yttrium compounds capable of being converted to yttrium oxide by calcination in an oxidizing atmosphere, the amount of said member selected being a small but effective amount for obtaining said in-line transmission up to 0.1 percent by weight of yttrium oxide, and at least one other member selected from the group consisting of magnesium oxide and magnesium compounds capable of being converted to magnesium oxide by calcination in an oxidizing atmosphere, the amount of said other member selected being a small but effective amount for obtaining said in-line transmission up to 0.1 percent by weight of magnesium oxide, (b) press-molding said mixture, (c) presintering the molded product in an oxidizing atmosphere at a temperature of 1,000° to 1,600°C. for a period of time from 5 to 60 minutes, and (d) sintering the presintered product in an environment selected from the group consisting of hydrogen and vacuum at a temperature of 1,700° to 1,900°C. for more than 2 hours and sufficient to produce a sintered body having said in line transmission.

16. A process for producing a transparent polycrystalline alumina sintered body having an in-line transmission of at least 60 percent per 0.5 millimeter thickness of a radiant energy of wavelengths between 320 and 1,100 millimicrons which comprises the steps of (a) preparing a homogeneous powdery mixture consisting essentially of highly pure fine alumina having a particle size conventionally suitable for sintering, at least one member selected from the group consisting of yttrium oxide and yttrium compounds capable of being converted to yttrium oxide by calcination in an oxidizing atmosphere, the amount of said member selected being a small but effective amount for obtaining said in-line transmission up to about 0.1 percent by weight of yttrium oxide, and at least one other member selected from the group consisting of magnesium oxide and magnesium compounds capable of being converted to magnesium oxide by calcination in an oxidizing atmosphere, the amount of said other member selected being a small but effective amount for obtaining said in-line transmission up to 0.1 percent by weight of magnesium oxide, (b) press-molding said mixture, (c) presintering the molded product in an oxidizing atmosphere at a temperature of 1,000° to 1,600°C. for a period of time from 5 to 60 minutes, and (d) sintering the presintered product in an environment selected from the group consisting of hydrogen and vacuum at a temperature of 1,700° to 1,900°C. for more than 2 hours and sufficient to produce a sintered body having said in-line transmission, the amount of sintering time being less at the higher sintering temperatures.

17. A process for producing a transparent polycrystalline alumina sintered body having an in-line transmission of at least 60 percent per 0.5 millimeter thickness of a radiant energy of wavelengths between 320 and 1,100 millimicrons which comprises the steps of (a) preparing a homogeneous powdery mixture consisting essentially of highly pure fine alumina having a particle size conventionally suitable for sintering, at least one member selected from the group consisting of yttrium oxide and yttrium compounds capable of being converted to yttrium oxide by calcination in an oxidizing atmosphere, the amount of said member selected being a small but effective amount for obtaining said in-line transmission up to 0.1 percent by weight of yttrium oxide, and at least one other member selected from the group consisting of magnesium oxide and magnesium compounds capable of being converted to magnesium oxide by calcination in an oxidizing atmosphere, the amount of said other member selected being a small but effective amount for obtaining said in-line transmission up to 0.1 percent by weight of magnesium oxide, (b) press-molding said mixture, (c) presintering the molded product in an oxidizing atmosphere at a temperature of 1,000° to 1,600°C. for a period of time from 5 to 60 minutes, and (d) sintering the presintered product in an environment selected from the group consisting of hydrogen and vacuum at a temperature of 1,700° to 1,900°C. for 2 to 5 hours.

* * * * *